United States Patent [19]

Sherk et al.

[11] Patent Number: 4,501,885
[45] Date of Patent: Feb. 26, 1985

[54] DILUENT AND INERT GAS RECOVERY FROM A POLYMERIZATION PROCESS

[75] Inventors: Fred T. Sherk; Janet L. Inkrott, both of Bartlesville, Okla.

[73] Assignee: Phillips Petroleum Company, Bartlesville, Okla.

[21] Appl. No.: 311,479

[22] Filed: Oct. 14, 1981

[51] Int. Cl.³ .................................................. C08F 6/06
[52] U.S. Cl. .................................... 528/501; 528/503
[58] Field of Search .......................................... 528/501

[56] References Cited

U.S. PATENT DOCUMENTS

| 2,949,447 | 8/1960 | Hawkins | 528/501 |
| 3,462,404 | 8/1969 | Stryker | 528/501 |
| 3,544,540 | 12/1970 | Houser | 528/501 |
| 4,153,501 | 5/1979 | Fink | 528/501 |

Primary Examiner—Christopher A. Henderson
Attorney, Agent, or Firm—Edward L. Bowman

[57] ABSTRACT

A polymerization process wherein a slurry of polymer and diluent is passed from the polymerization zone to a flash zone, then polymer solids having residual diluent carried thereon are passed to a purge zone wherein a heated noncombustible gas is used to remove additional amounts of diluent, and then the vapor purge zone is condensed and cooled to produce a vapor stream comprising said noncombustible gas and a liquid stream comprising diluent.

4 Claims, 1 Drawing Figure

DILUENT AND INERT GAS RECOVERY FROM A POLYMERIZATION PROCESS

BACKGROUND

This invention relates to a polymerization process. In a more specific aspect, the invention relates to a method of recovering the diluent employed in the polymerization process.

In many polymerization processes for the production of normally solid polymer, a stream is formed which is a slurry of particulate polymers suspended in a liquid medium, ordinarily the reaction diluent. Typical examples of such processes are disclosed in Hogan and Banks' U.S. Pat. No. 2,285,721 and in G. T. Leatherman and C. V. Detter's U.S. patent application Ser. No. 590,567, filed June 11, 1956, and now abandoned. The disclosures of that patent and that application are incorporated herein by reference. While the polymerization processes described in those documents employ a catalyst comprising chromium oxide and a support, the present invention is applicable to any process producing an effluent comprising a slurry of particulate polymer solids suspended in liquid diluent. Such reaction processes include those which have come to be known in the art as particle form polymerizations.

In order to minimize costs in most commercial processes, it is desired to separate the polymer and the diluent in such a manner that the diluent is not exposed to contamination so that the diluent can be recycled to the polymerization zone with minimal, if any, purification. Some typical diluent recovery processes are disclosed in the Scoggin et al U.S. Pat. No. 3,152,872, the disclosure of which is incorporated herein by reference. In those processes, a slurry of solid polymer and diluent taken from the polymerization zone is passed into a flash zone wherein a substantial portion of the diluent is separated from the polymer. The thus separated diluent is condensed and purified for reuse if desired. The polymer solids having residual amounts of diluent contained thereon are passed from the flash zone to a conveyor dryer zone wherein a portion of the diluent is vaporized and passed back to the flash zone. The polymer solids still carrying residual amounts of diluent are then passed to a purge zone wherein a heated non-combustible gas is used to remove the diluent. In order to minimize loss of diluent, there has generally been an inert gas seal provided between the dryer and the purge zone. In the past, the vaporized diluent from the purge zone has been vented or flared. To minimize operating costs and hydrocarbon emissions, it is increasing important to recover even the diluent from the purge step. It has been estimated that the amount of diluent lost through flaring of the purge zone effluent could be as high as 0.03 pounds per pound of polymer. An object of the present invention is to provide a particularly useful process for recovering the diluent from such purge zones.

SUMMARY OF THE INVENTION

In accordance with the present invention, the diluent vapor from the purge zone is cooled and compressed to produce a mixed stream comprising liquid diluent and vapor comprising the noncombustible purge gas, the stream is separated into a liquid stream and a vapor stream, with both said vapor stream and said liquid stream being used to provide a portion of the cooling to which the mixed stream is subjected, and recovering said diluent stream.

DETAILED DESCRIPTION OF THE PRESENT INVENTION

Figure 1:
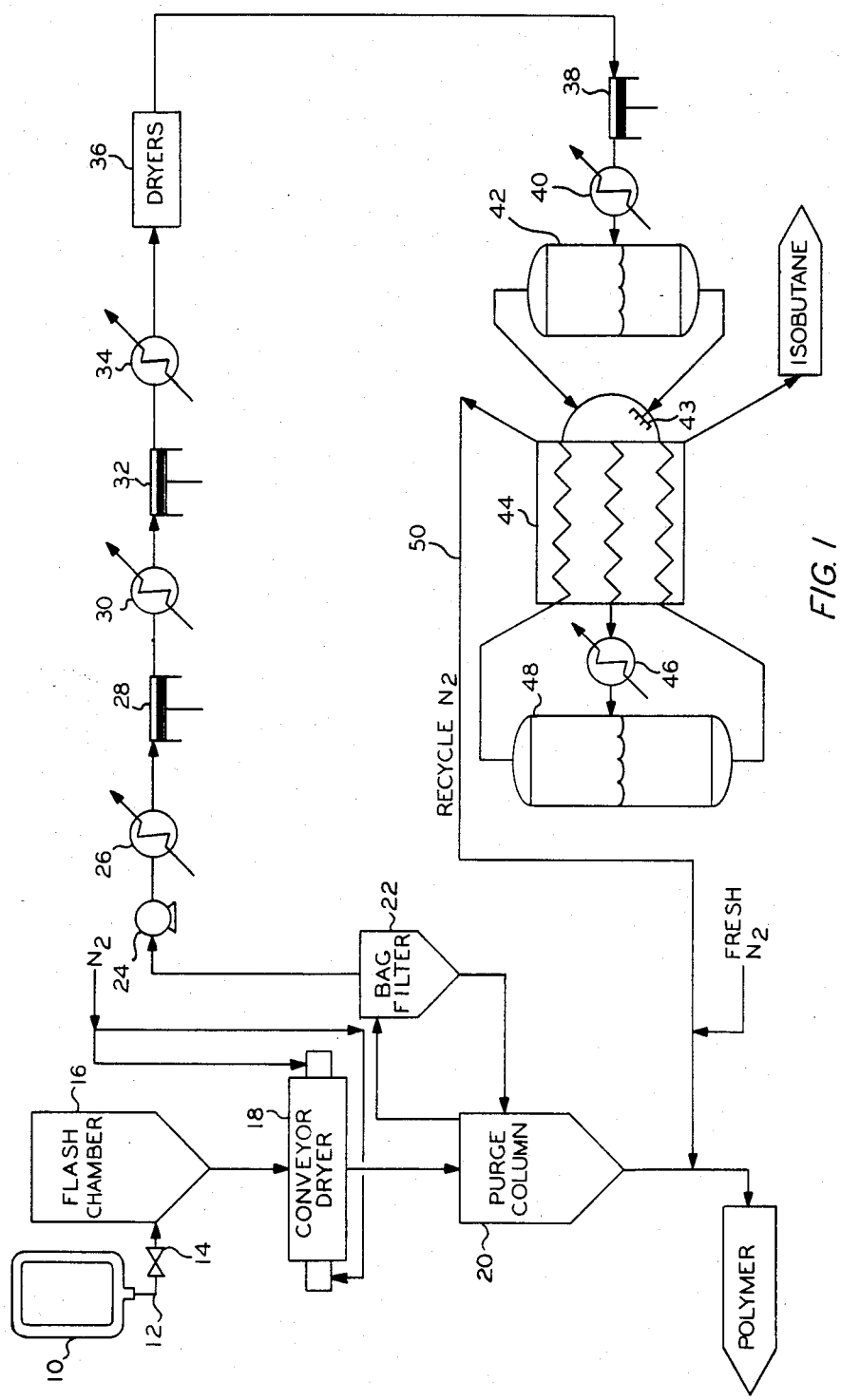
FIG. 1 is a schematic process flow diagram of a process employing the present invention.

While the present invention is applicable to any mixture which comprises a slurry of polymer solid and diluent, it is particularly applicable to the slurries resulting from olefin polymerizations. The olefin monomers generally employed in such reactions are 1-olefins having up to 8 carbon atoms per molecule and no branching nearer the double bond than the 4-position. Typical examples include ethylene, propylene, butene-1, 1-pentene, and 1,3-butadiene.

Typical diluents employed in such olefin polymerizations include hydrocarbons having 3 to 12, preferably 3 to 8 carbon atoms per molecule, such as propane, propylene, n-butane, n-pentane, isopentane, n-hexane toluene, isooctane, isobutane, 1-butene, and the like. In some cases, naphthene hydrocarbons having 5 to 6 carbon atoms in the naphthenic ring are also used. Examples of such naphthenic hydrocarbons include cyclohexane, cyclopentane, methylcyclopentane, ethylcyclohexane, and the like.

Although any suitable non-combustible gas can be employed as the purge gas, a purge gas consisting essentially of nitrogen is currently preferred.

A further understanding of the present invention will be provided by referring to the drawing. The polymerization in the illustrated embodiment is carried out in a loop reactor 10. A slurry of solid polymer and diluent is passed through conduit 12 and valve 14 into flash chamber 16. Diluent vapors taken overhead from the flash column are recovered in a conventional manner. Solid polymer still carrying diluent is then passed into the heated conveyor dryer 18. Diluent vaporized in the conveyor dryer can pass back into the flash column. From the conveyor dryer, the solid polymer is passed to purge column 20. An inert gas such as nitrogen can be used to provide a gas seal, if desired, to minimize the amount of diluent that passes to the purge column.

The diluent vapor from purge column 20 is passed to bag filter 22. From the bag filter, the vapor goes through a blower 24 to a cooler 26 and then to a compressor 28. From compressor 28, the stream is passed to cooler 30 and compressor 32 and then through another cooler 34. The cooled stream is then passed through a dryer zone 36, preferably a pair of fixed bed dryers, to remove any water contained in the stream.

From dryer zone 36, the stream is passed to a third compressor 38. After the last stage of compression, the stream is passed to cooler 40 and to a separator 42. The liquid portion is passed through a sparger 43 and recombined with the vapor phase and then passed through plate fin heat exchange 44. The separation of the vapor and liquid phases and recombining of them assures an even dispersion of the liquid through the plate fin heat exchanger.

The combined stream is passed from the plate fin heat exchanger 44 to a cooler 46 and then to a separator 48. The vapor stream and the liquid stream are in turn passed through plate fin heat exchanger 44 as separate streams to act as the cooling media for the mixed stream. The vapor stream exiting the plate fin heat exchanger is then recycled via line 50 for use as the purge gas in purge column 20. The liquid stream comprising mainly diluent can then be recovered and passed to a purification zone where it can readily be purified for reuse in the polymerization process.

The invention will now be further illustrated by the following description of its use in a polyethylene plant capable of producing about 80,000 metric tons per year of polymer. In such a process, typically the diluent is isobutane and the noncombustible gas is nitrogen.

Typically, the vapor stream taken overhead from purge column 20 in such a process would contain about 60 weight percent isobutane and about 36 weight percent nitrogen. The isobutane-nitrogen stream coming out of bag filter 22 would typically be at temperature of about 180° F. and a pressure of about 10 psia. From the bag filter 22, the stream goes through blower 24 to cooler 26 which decreases the temperature of the stream to about 120° F. After passing through a knockout tank, not shown, the stream is then passed into the first compressor where a compression ratio of 2.8 is provided. The compressed stream is then passed through cooler 30 wherein the stream is again cooled to 120° F. and passed through a knockout tank, not shown. This knockout tank provides for removal of any liquid that may be present at 120° F. and 47 psia. The first knockout tank provides for removal of any liquid that is present at 120° F. and 18 psia.

The vapor stream from the second knockout tank is then passed to the second stage compressor 32 where the compression ratio is also 2.8. The compressed stream is passed through cooler 34 wherein the stream is again cooled to 120° F. The thus cooled stream is then passed into a third knockout drum, not shown, wherein liquid is removed that is present at 110° F. and 130 psia. The cooled stream is then passed through the drying zone 36 comprising two beds of material such as Alcoa H-151 capable of removing any water contained in the vapors.

The dried stream is then passed to the third compressor 38 where the compression ratio is also 2.8. The compressed stream is then passed through cooler 40 wherein it is cooled to 100° F. After the last compression, the stream exists as a liquid and a vapor. The stream is passed into separator 42 wherein at 360 psia the vapor is taken overhead and the liquid removed from the bottom. The liquid is passed through sparger 43, recombined with the vapor, and passed through the plate-fin heat exchanger. The mixed stream will exit the plate-fin heat exchanger at about 65° F. and is then cooled to −10° F. using a refrigerant such as −20° F. propane. At −10° F. and 350 psia, ninety-three percent of the isobutane can be separated from the nitrogen. Under such conditions, the amount of isobutane in the nitrogen stream should generally be low enough that it could be mixed with air without danger of explosion. Such a recovered nitrogen stream can safely be recycled to the purge column. Thus with the present invention not only is isobutane that was previously flared recovered, but also the nitrogen can be reused.

The nitrogen stream and the isobutane stream are separated in separator 48. Each of those cooled streams is individually passed through the plate-fin heat exchanger to provide the cooling of the mixed feedstream.

Typical stream compositions in pounds/day for such a process would be as follows:

|  | Stream To Cooler 46 | Recycle $N_2$ | Isobutane Recovery |
|---|---|---|---|
| $N_2$ | 5066.0 | 4966.1 | 99.8 |
| $C_2=$ | 136.6 | 76.4 | 60.3 |
| $C_2$ | .7 | .3 | .3 |
| $C_3$ | 1.0 | .2 | .8 |
| $i-C_4$ | 8369.5 | 602.7 | 7766.8 |
| $C_4$ | 415.6 | 19.3 | 369.3 |
| $C_6=$ | 11.4 | .1 | 11.3 |
| $C_6$ | 1.1 | >.1 | 1.1 |

Thus, the process can produce a vapor stream consisting of about 88 weight percent nitrogen and about 11 percent isobutane. The liquid stream contains about 1 weight percent nitrogen and about 93 weight percent isobutane. Such a liquid stream can readily be purified with the purification system used on the isobutane recovered from the flash chamber.

The main purpose of the nitrogen stream to the conveyor dryer has heretofore been to decrease the amount of isobutane that ends up in the purge column. Since with the present invention the isobutane will be recovered, the present invention also allows one to eliminate the nitrogen purge of the conveyor dryer if desired.

As will be evident to those skilled in the art various modifications of the present invention can be made without departing from the spirit and scope thereof.

What is claimed is:

1. In a polymerization process wherein a slurry of olefin polymer solids and diluent is passed from the polymerization zone into a flash zone wherein a substantial portion of the diluent is separated from the polymer and the polymer solids containing residual amounts of diluent are passed to a purge zone wherein said polymer solids are contacted with a heated noncombustible gas to separate additional amounts of the diluent therefrom, the improvement comprising cooling and compressing the vaporous effluent from the purge zone to produce a mixed stream comprising liquid comprising said diluent and vapor comprising said noncombustible gas, separating said liquid stream and said vapor stream, using both said vapor stream and said liquid stream as heat exchange fluids for a portion of the cooling to which the mixed stream is subjected, recovering said diluent stream, and using said vapor stream as at least a portion of the noncombustible gas in the purge zone.

2. In a polymerization process wherein a slurry of solid polyethylene and isobutane diluent is passed from the polymerization zone into a flash zone wherein a substantial portion of said diluent is separated from the polymer and the polymer solids containing residual amounts of diluent are passed to a purge zone wherein said polymer solids are contacted with heated nitrogen to separate additional amounts of the diluent therefrom, the improvement comprising cooling and compressing the vaporous effluent from the purge zone until the effluent is at a temperature and pressure such that the liquid phase comprises diluent containing less than about 5 weight percent nitrogen, separating the gaseous and liquid phases, and using said gaseous phase as at least a portion of the heated nitrogen used in said purge zone.

3. A process according to claim 2 wherein said liquid phase and said gaseous phase are separated at a temperature of about −10° F. and a pressure of about 350 psia.

4. A process according to claim 3 wherein said effluent from the purge zone is cooled by being passed through a heat exchanger and wherein the separated liquid phase and the gaseous phases are individually passed through the heat exchanger as cooling fluid for the heat exchanger.

* * * * *